(12) United States Patent
Gao et al.

(10) Patent No.: US 9,048,649 B2
(45) Date of Patent: Jun. 2, 2015

(54) METHOD AND APPARATUS FOR ANTI-ICING AND DEICING POWER TRANSMISSION LINES

(75) Inventors: Lijun Gao, Kent, WA (US); Ronald Ward Sackman, Mountain View, CA (US); George Roe, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 561 days.

(21) Appl. No.: 13/425,171

(22) Filed: Mar. 20, 2012

(65) Prior Publication Data

US 2013/0249321 A1 Sep. 26, 2013

(51) Int. Cl.
*H02G 7/16* (2006.01)
*H02J 3/00* (2006.01)

(52) U.S. Cl.
CPC ... *H02G 7/16* (2013.01); *H02J 3/00* (2013.01)

(58) Field of Classification Search
CPC ....................................................... H02G 7/16
USPC ......................................................... 307/147
See application file for complete search history.

(56) References Cited

U.S. PATENT DOCUMENTS

| 4,082,962 | A | * | 4/1978 | Burgsdorf et al. | ............ | 307/147 |
|---|---|---|---|---|---|---|
| 4,085,338 | A | * | 4/1978 | Genrikh et al. | ............... | 307/147 |
| 4,126,792 | A | * | 11/1978 | Genrikh et al. | ............... | 307/112 |
| 4,135,221 | A | * | 1/1979 | Genrikh et al. | ................... | 361/1 |
| 6,018,152 | A | * | 1/2000 | Allaire et al. | ................. | 219/501 |
| 6,396,172 | B1 | * | 5/2002 | Couture | ........................ | 307/125 |
| 6,433,520 | B1 | * | 8/2002 | Schauder | ...................... | 323/207 |
| 6,486,569 | B2 | * | 11/2002 | Couture | ......................... | 307/98 |
| 7,157,812 | B2 | * | 1/2007 | Couture | ......................... | 307/98 |
| 7,235,900 | B1 | * | 6/2007 | Couture | ......................... | 307/98 |
| 7,271,508 | B2 | * | 9/2007 | Brochu et al. | ................ | 307/147 |
| 2009/0250449 | A1 | | 10/2009 | Petrenko et al. | | |
| 2011/0208367 | A1 | | 8/2011 | Sackman et al. | | |
| 2013/0054183 | A1 | * | 2/2013 | Afzal et al. | ................... | 702/141 |

FOREIGN PATENT DOCUMENTS

CN 101325324 B 8/2010

OTHER PUBLICATIONS

PCT search report dated Sep. 13, 2013 regarding application PCT/US2013/021395, international filing date Jan. 14, 2013, applicant The Boeing Company, 11 pages.

(Continued)

*Primary Examiner* — Adi Amrany
(74) *Attorney, Agent, or Firm* — Yee & Associates, P.C.

(57) ABSTRACT

A method and apparatus for managing icing of a plurality of transmission lines in a power transmission system. A power transmission system comprises a plurality of transmission lines and a control system. A first amount of power flows into the power transmission system through the plurality of transmission lines and a second amount of power flows out of the power transmission system through the plurality of transmission lines. The control system is configured to change a flow of power through the plurality of transmission lines such that icing of the plurality of transmission lines is managed. The first amount of power flowing into the power transmission system and the second amount of power flowing out of the power transmission system remains substantially constant during the change in the flow of power through the plurality of transmission lines.

21 Claims, 7 Drawing Sheets

(56) References Cited

OTHER PUBLICATIONS

Knowlton et al., "Standard Handbook for Electrical Engineers", Frank F. Fowle Editor-in-Chief, McGraw-Hill Book Company, Fourth Edition, Jan. 1917, pp. 1, 1302, 1957.

Smith et al., "Sleet-Melting Practices—Niagara Mohawk System", Transactions of the American Institute of Electrical Engineers Power Apparatus and Systems, Part III, vol. 71 No. 1, Jan. 1952, pp. 631-634.

Davies et al., "Ice-Melting and Prevention Practices on Transmission Lines", Transactions of the American Institute of Electrical Engineers, vol. 71 No. 3, Aug. 1952, pp. 593-597.

Laforte et al., "State-of-the-art on power line de-icing", Elsevier Science, Atmospheric Research vol. 46 Nos. 1-2, , Copyright 1998, pp. 143-158.

Li et al., "Review of De-icing Methods for Transmission Lines", 2010 International Conference on Intelligent System Design and Engineering Application, Oct. 2010, pp. 310-313.

"Transmission Line Weather Monitoring", Vaisala, copyright 2011-2012, 2 pages, accessed Feb. 17, 2012, http://www.vaisala.com/en/energy/transmission/lineweathermonitoring/Pages/default.aspx.

Merril et al., "Transmission Icing: A Physical Risk with a Physcial Hedge", IEEE Power Engineering Society General Meeting, Jun. 2006, 7 pages.

Sullivan et al., "Breaking the ice: de-icing power transmission lines with high-frequency, high-voltage excitation", IEEE Industry Applications Magazine, vol. 9 No. 5, Sep. 2003, pp. 49-54.

International Preliminary Report on Patentability and Written Opinion dated Sep. 23, 2014, regarding Application No. PCT/US2013/021395, 8 pages.

\* cited by examiner

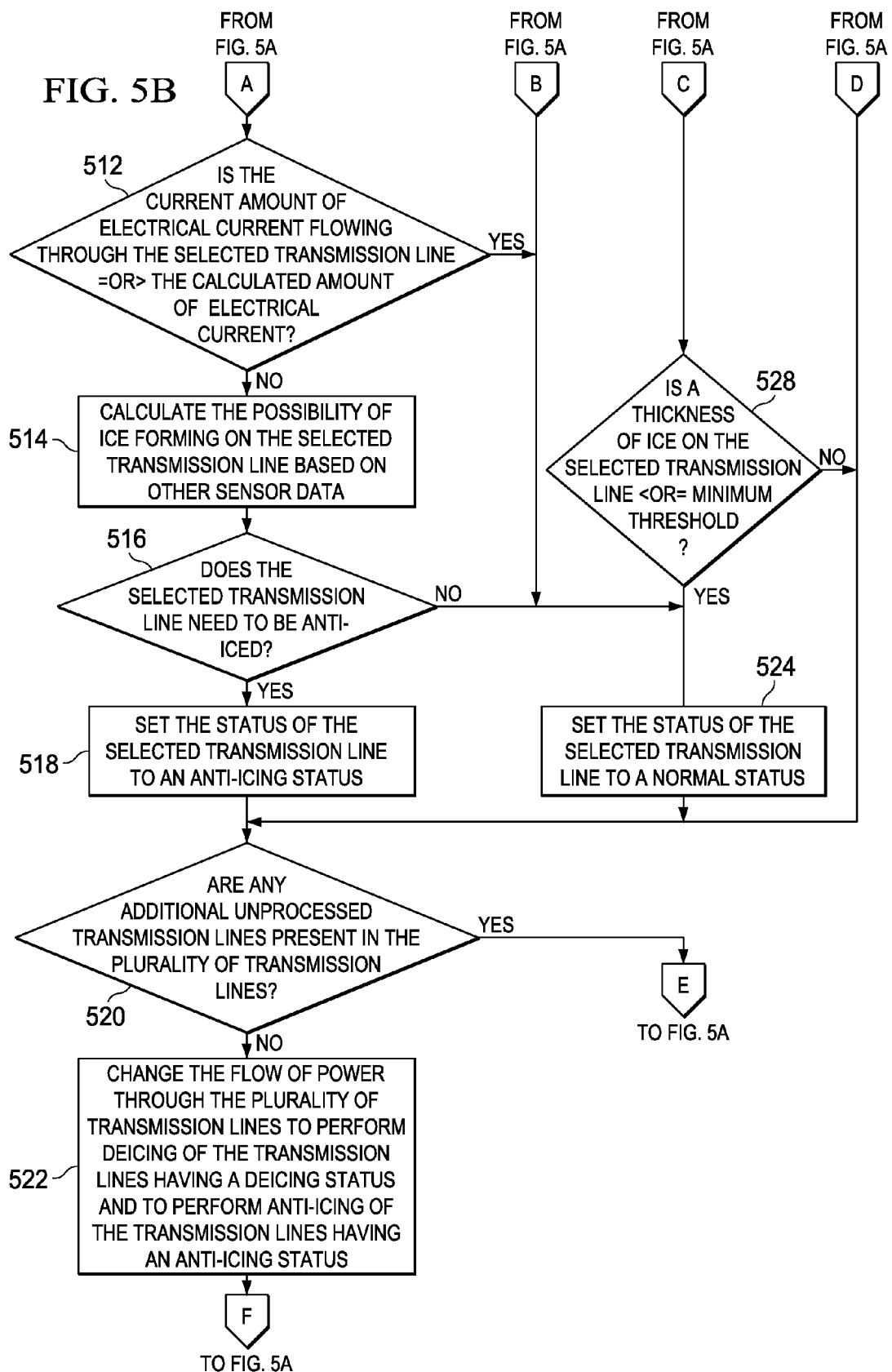

METHOD AND APPARATUS FOR
ANTI-ICING AND DEICING POWER
TRANSMISSION LINES

BACKGROUND INFORMATION

1. Field

The present disclosure relates generally to anti-icing and deicing transmission lines in a power transmission system. Still more particularly, the present disclosure relates to a method and apparatus for anti-icing and deicing transmission lines without changing the amount of power that flows into the power transmission system and the amount of power that flows out of the power transmission system.

2. Background

A power transmission system is configured to transfer electrical energy generated by a power generation system to a power distribution system. In some cases, a portion of the transmission lines in a power transmission system are located above ground and exposed to the air in the environment around these transmission lines. Consequently, weather conditions in the environment around these transmission lines may affect the performance of these transmission lines.

For example, in some situations, weather conditions may cause ice to form on these transmission lines. The different types of weather conditions that may cause icing of transmission lines may include, for example, without limitation, temperatures below freezing, freezing rain, snow, sleet, and other types of weather conditions.

Ice may form on a transmission line when a temperature of the air around the transmission line is between about negative three degrees Celsius (C.°) and about two degrees Celsius (C.°). Other factors may also affect the formation of ice on a transmission line. These other factors may include, for example, the temperature of the transmission line, wind velocity, humidity, and other suitable factors.

Currently, different solutions are available for anti-icing and deicing transmission lines. Anti-icing includes preventing ice from forming on transmission lines. Deicing includes removing ice that has already formed on the transmission lines.

Some currently available methods for anti-icing and deicing a transmission line include applying a short circuit alternating current (AC) or a short circuit direct current (DC) to the conductor in a transmission line to heat the transmission line. However, these methods may cause an undesired interruption of power flow through the power transmission system. Further, these methods may require more electrical energy than desired to heat the conductor to a desired temperature for anti-icing or deicing.

Additionally, some currently available methods for anti-icing and deicing a transmission line may require a human operator to initiate one or more operations before anti-icing and/or deicing can be performed. In some cases, a human operator may be unable to initiate the operations needed for anti-icing and/or de-icing to be performed as quickly as desired.

Other currently available methods for anti-icing a transmission line include applying a coating to the surface of the transmission line. The coating is comprised of a material configured to reduce the possibility of ice adhering to the transmission line. However, the quality of the materials used in the coating for these types of methods may decrease over time. Consequently, a new coating may need to be reapplied to reduce the possibility of ice adhering to the transmission line.

Further, this coating may not provide the ability to deice a transmission line once ice has adhered to the transmission line. Additionally, these materials used for the coating may be more expensive than desired. Therefore, it would be desirable to have a method and apparatus that takes into account one or more of the issues discussed above as well as possibly other issues.

SUMMARY

In one illustrative embodiment, a power transmission system comprises a plurality of transmission lines and a control system. A first amount of power flows into the power transmission system through the plurality of transmission lines and a second amount of power flows out of the power transmission system through the plurality of transmission lines. The control system is configured to change a flow of power through the plurality of transmission lines such that icing of the plurality of transmission lines is managed. The first amount of power flowing into the power transmission system and the second amount of power flowing out of the power transmission system remains substantially constant after the flow of power through the plurality of transmission lines is changed.

In another illustrative example, a method is provided for managing icing of a plurality of transmission lines in a power transmission system. Sensor data about the plurality of transmission lines and an environment around each transmission line in the plurality of transmission lines in the power transmission system is received. A first amount of power flows into the power transmission system through the plurality of transmission lines and a second amount of power flows out of the power transmission system through the plurality of transmission lines. A flow of power through the plurality of transmission lines is changed based on the sensor data such that the icing of the plurality of transmission lines is managed. The first amount of power flowing into the power transmission system and the second amount of power flowing out of the power transmission system remains substantially constant after the flow of power through the plurality of transmission lines is changed.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIGS. 5A and 5B are illustrations of a process for managing icing of a plurality of transmission lines in a transmission system in the form of a flowchart in accordance with an illustrative embodiment.

DETAILED DESCRIPTION

The different illustrative embodiments recognize and take into account different considerations. For example, the different illustrative embodiments recognize and take into account that some currently available methods for anti-icing and deicing transmission lines may be unable to redistribute the flow of power through a power transmission system to perform these operations without increasing the power flow into and out of the power transmission system more than desired.

Further, the different illustrative embodiments recognize and take into account that it may be desirable to have a system configured to perform anti-icing and deicing of transmission lines without using more electrical energy than desired. The different illustrative embodiments also recognize and take into account that having a system configured to perform anti-icing and deicing of transmission lines in response to substantially real-time data may be desirable.

Thus, the different illustrative embodiments provide a method and apparatus for managing icing of a plurality of transmission lines in a power transmission system. In one illustrative embodiment, a power transmission system comprises a plurality of transmission lines and a control system. A first amount of power flows into the power transmission system through the plurality of transmission lines and a second amount of power flows out of the power transmission system through the plurality of transmission lines. The control system is configured to change a flow of power through the plurality of transmission lines such that icing of the plurality of transmission lines is managed. The first amount of power flowing into the power transmission system and the second amount of power flowing out of the power transmission system remains substantially constant after the flow of power through the plurality of transmission lines is changed.

Figure 1:
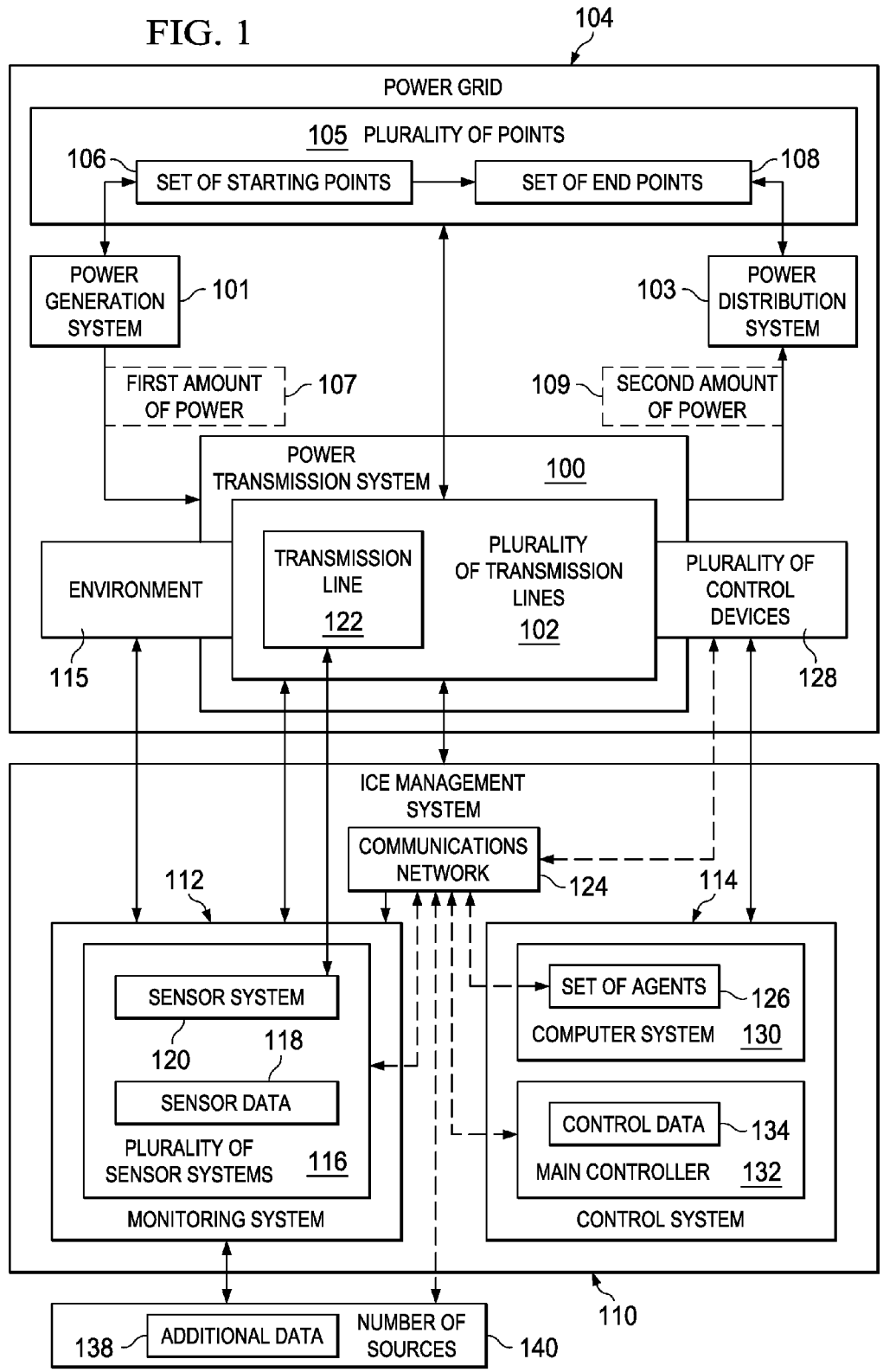
FIG. 1 is an illustration of a power transmission system in the form of a block diagram in accordance with an illustrative embodiment.

Referring now to the figures and, in particular, with reference to FIG. 1, an illustration of a power transmission system in the form of a block diagram is depicted in accordance with an illustrative embodiment. In these illustrative examples, power transmission system 100, power generation system 101, and power distribution system 103 form power grid 104. Power transmission system 100 is configured to transfer power from power generation system 101 to power distribution system 103.

In these illustrative examples, first amount of power 107 flows into power transmission system 100 from power generation system 101. Further, second amount of power 109 flows out of power transmission system 100 into power distribution system 103.

As depicted, power transmission system 100 includes plurality of transmission lines 102. As used herein, a "plurality of" items means two or more items. For example, plurality of transmission lines 102 means two or more transmission lines.

As used herein, a "transmission line", such as one of plurality of transmission lines 102, may comprise any number of electrical lines electrically connected to each other and configured to carry power. Further, an "electrical line", as used herein, may comprise any number of conductors, insulators, supporting structures, and/or other components used to carry power from one location to another location. A "conductor", as used herein, may be any material through which an electrical current may flow. An "insulator", as used herein, may be any material configured to resist the flow of an electrical current through the material.

In these illustrative examples, when a first component is electrically connected to a second component, the first component is connected to the second component such that an electrical current may flow from the first component to the second component, the second component to the first component, or a combination of the two. The first component may be electrically connected to the second component without any additional components between the two components. The first component also may be electrically connected to the second component by one or more other components.

In these illustrative examples, plurality of transmission lines 102 is configured to electrically connect plurality of points 105 in power grid 104 to each other. Plurality of points 105 in power grid 104 may include, for example, without limitation, power generators, power generation stations, substations, transformers, loads, buses, busbars, distribution boards, and/or other electrical components.

As depicted, plurality of transmission lines 102 is configured to transfer power between plurality of points 105 in power grid 104. For example, plurality of transmission lines 102 may be configured to transfer power from set of starting points 106 in power grid 104 to set of end points 108 in power grid 104.

As used herein, a "set of" items means one or more items. For example, set of starting points 106 may be one or more starting points. In these illustrative examples, a starting point in set of starting points 106 may be a point in power transmission system 100 or a point in power generation system 101. For example, without limitation, a starting point in set of starting points 106 may be a power source, a transmission bus, a busbar, a substation, a power generation station, or some other suitable type of component in power grid 104.

An end point in set of end points 108 may be a point in power transmission system 100 or a point in power distribution system 103. For example, without limitation, an end point in set of end points 108 may be a substation, a load, a bus, a busbar, or some other suitable type of component in power grid 104. In some illustrative examples, an end point for one transmission line may be a starting point for another transmission line.

Each transmission line in plurality of transmission lines 102 is configured to transfer power from a starting point in set of starting points 106 to an end point in set of end points 108. In these illustrative examples, more than one transmission line in plurality of transmission lines 102 may carry power from a same starting point in set of starting points 106. Further, more than one transmission line in plurality of transmission lines 102 may deliver power to a same end point in set of end points 108.

In these illustrative examples, power transmission system 100 includes ice management system 110. Ice management system 110 is configured to manage icing of plurality of transmission lines 102. Icing of a transmission line occurs when ice forms on one or more of plurality of transmission lines 102. In these illustrative examples, "ice" or "icing" may include frozen water, frost, snow, or any combination of these three.

Ice management system 110 may be configured to prevent the formation of ice on plurality of transmission lines 102. As used herein, the process of preventing the icing of plurality of transmission lines 102 may be referred to as "anti-icing".

Additionally, ice management system 110 may be configured to remove ice that has already formed on plurality of transmission lines 102. Removing ice that has formed on plurality of transmission lines 102 may include removing some or substantially all of the ice that has formed on plurality of transmission lines 102. As used herein, the process of removing ice that has formed on plurality of transmission lines 102 may be referred to as "deicing".

In these illustrative examples, ice management system 110 includes monitoring system 112 and control system 114. Monitoring system 112 is configured to monitor plurality of transmission lines 102 and environment 115 around plurality of transmission lines 102. In one illustrative example, monitoring system 112 includes plurality of sensor systems 116 configured to generate sensor data 118.

Each sensor system in plurality of sensor systems 116 corresponds to a transmission line in plurality of transmission lines 102. Sensor system 120 is an example of one of plurality of sensor systems 116. As depicted, sensor system 120 corresponds to transmission line 122 in plurality of transmission lines 102.

Sensor system 120 may comprise one or more sensors configured to monitor transmission line 122 and environment 115 around transmission line 122. These sensors may include, for example, without limitation, a temperature sensor, a weather sensor, a voltage sensor, a current sensor, a power sensor, a humidity sensor, an ice detection sensor, and/or other suitable types of sensors. In this manner, sensor data 118 generated by plurality of sensor systems 116 may include sensor data about plurality of transmission lines 102 and sensor data about environment 115 around each of plurality of transmission lines 102.

A sensor in sensor system 120 may correspond to transmission line 122 in a number of different ways. For example, the sensor may be physically attached to transmission line 122, electrically connected to transmission line 122, attached to a structure near transmission line 122, or associated with transmission line 122 in some other suitable manner.

Sensor data 118 generated by plurality of sensor systems 116 is sent to control system 114 using communications network 124 in ice management system 110. Communications network 124 may include any number of wireless communications links, wired communications links, optical communications links, and/or other suitable types of communications links. In some cases, plurality of sensor systems 116 may send sensor data 118 to control system 114 over one or more of plurality of transmission lines 102.

In these illustrative examples, control system 114 comprises set of agents 126 and plurality of control devices 128. As used herein, an "agent" in set of agents 126 may be any type of controller configured to communicate with and/or control at least one sensor system in plurality of sensor systems 116 and at least one control device in plurality of control devices 128. An agent in set of agents 126 may be implemented using hardware, software, or a combination of both.

For example, set of agents 126 may be implemented in computer system 130. Computer system 130 may comprise a number of computers. When more than one computer is present in computer system 130, these computers are in communication with each other. Further, these computers may be located in a same location or in different locations, depending on the implementation.

Set of agents 126 receives and processes sensor data 118. Set of agents 126 uses sensor data 118 to control plurality of control devices 128. For example, set of agents 126 may send commands to plurality of control devices 128 using communications network 124.

Plurality of control devices 128 may be distributed along plurality of transmission lines 102. One or more of plurality of control devices 128 may be located on a same transmission line in plurality of transmission lines 102. A control device in plurality of control devices 128 may be associated with a transmission line in plurality of transmission lines 102 by being electrically connected to the transmission line, magnetically coupled to the transmission line, or associated with the transmission line in some other suitable manner.

In these illustrative examples, a control device in plurality of control devices 128 is any device configured to change a flow of electrical current through the transmission line on which the control device is located. The control device may change the flow of electrical current through the transmission line in a number of different ways. For example, without limitation, the control device may change the flow of electrical current through the transmission line by changing an amount of electrical current that flows through the transmission line, changing a voltage across the transmission line, changing an impedance for the transmission line, and/or changing the flow power through the transmission line in some other suitable manner.

A control device in plurality of control devices 128 may be selected from one of, for example, without limitation, a distributed flexible alternating current transmission system device, a transformer, a controllable network transformer (CNT), a distributed series reactance (DSR) device, a switch, or some other suitable type of control device. In one illustrative example, plurality of control devices 128 may form a distributed flexible alternating current transmission system (DFACTS). In this illustrative example, each control device in plurality of control devices 128 may be a distributed flexible alternating current transmission system (DFACTS) device.

Set of agents 126 uses sensor data 118 to determine whether the possibility of ice forming on any transmission line in plurality of transmission lines 102, such as, for example, transmission line 122, is greater than selected tolerances. If the possibility of ice forming on a particular transmission line is greater than selected tolerances, set of agents 126 controls the portion of plurality of control devices 128 located on that transmission line to increase the flow of electrical current through that transmission line.

Increasing the flow of electrical current through this transmission line heats the transmission line to reduce the possibility of ice forming on the transmission line. In particular, set of agents 126 controls the portion of plurality of control devices 128 located on the particular transmission line to heat the transmission line such that water does not adhere to the transmission line and solidify to form frost or ice. In other words, set of agents 126 performs anti-icing of the transmission line based on sensor data 118 using the portion of plurality of control devices 128 located on the particular transmission line.

Further, set of agents 126 may also use sensor data 118 to determine whether ice has already formed on any transmission line in plurality of transmission lines 102. If ice has formed on a particular transmission line, set of agents 126 controls the portion of plurality of control devices 128 located on that transmission line to increase the flow of electrical current through that transmission line. The flow of electrical current is increased such that the transmission line is heated to a temperature that causes the ice on the transmission line to melt. In this manner, set of agents 126 performs deicing of the transmission line using one or more of plurality of control devices 128.

In these illustrative examples, set of agents 126 performs anti-icing and deicing in a manner such that first amount of power 107 that flows into power transmission system 100 and second amount of power 109 that flows out of power transmission system 100 remains substantially constant. In particular, anti-icing and deicing are performed such that first amount of power 107 and second amount of power 109 remain substantially constant within selected tolerances.

More than one transmission line may carry power away from power generation system 101 and/or deliver power to power distribution system 103. Set of agents 126 is configured to use plurality of control devices 128 to redistribute the flow of power through plurality of transmission lines 102 in power transmission system 100 such that first amount of power 107 flowing into power transmission system 100 and second amount of power 109 flowing out of power transmission system 100 remains substantially constant.

When the flow of power through plurality of transmission lines 102 is redistributed to perform anti-icing and/or deicing operations, the net flow of power through a particular starting point in set of starting points 106 or a particular end point in set of end points 108 remains substantially zero within selected tolerances. However, the amount of power flowing into or out of a point in plurality of points 105 through a particular transmission line may be increased or decreased.

In this manner, set of agents 126 may perform anti-icing and/or deicing of one or more of plurality of transmission lines 102 without changing the overall flow of power into and out of power transmission system 100 outside of selected tolerances. Of course, the amount of power flowing into and/or out of power transmission system 100 may be changed independently of the anti-icing and deicing processes. Further, set of agents 126 may use sensor data 118 to control plurality of control devices 128 such that anti-icing and deicing is initiated in substantially real-time. In other words, unintentional delays in the time needed to initiate anti-icing and deicing based on sensor data 118 may be reduced.

In these illustrative examples, the agents in set of agents 126 may work cooperatively and/or independently of each other. In one illustrative example, each agent in set of agents 126 may be configured to receive a particular portion of sensor data 118 from a particular portion of plurality of sensor systems 116. Further, each agent may be configured to control the portion of plurality of control devices 128 located on a particular portion of plurality of transmission lines 102.

In some illustrative examples, set of agents 126 may be controlled by main controller 132 in control system 114. Main controller 132 may be implemented in computer system 130 or some other computer system, depending on the implementation. In some cases, main controller 132 is part of a power operations center for power grid 104.

Set of agents 126 may control plurality of control devices 128 based on control data 134 received from main controller 132 in addition to or in place of sensor data 118, depending on the implementation. Main controller 132 may send control data 134 to set of agents 126 using communications network 124. Control data 134 may comprise any number of policies, commands, rules, regulations, requirements, customer requests, safety alerts, and/or other suitable types of data.

In some illustrative examples, set of agents 126 may require authorization from main controller 132 to change the flow of power through plurality of transmission lines 102 using plurality of control devices 128 to perform deicing operations. However, in these examples, set of agents 126 may not require authorization to change the flow of power through plurality of transmission lines 102 to perform anti-icing operations.

In other illustrative examples, set of agents 126 may determine that the amount of power flowing through plurality of transmission lines 102 is insufficient to perform anti-icing and/or deicing operations based on sensor data 118 and control data 134. For example, set of agents 126 may be unable to redistribute the flow of power through plurality of transmission lines 102 using plurality of control devices 128 in a manner that heats a transmission line to the temperature needed to deice or anti-ice the transmission line.

In these situations, set of agents 126 may send a request to main controller 132 or some other suitable operations center requesting that first amount of power 107 flowing into power transmission system 100 from power generation system 101 and second amount of power 109 flowing out of power transmission system 100 be increased. In other words, power generation by power generation system 101 and load consumption by power distribution system 103 may be increased.

In some illustrative examples, set of agents 126 may use additional data 138 provided by number of sources 140 to manage icing of plurality of transmission lines 102. Additional data 138 may include, for example, without limitation, weather forecasts, icing reports, wind data, police reports, observation reports, and/or other suitable data that may be used to determine when the flow of power through plurality of transmission lines 102 needs to be redistributed to remove and/or prevent icing on one or more of plurality of transmission lines 102.

Number of sources 140 may include, for example, without limitation, a weather station, a police station, human operators, and/or other suitable sources of additional data 138. As depicted, number of sources 140 may be separate from ice management system 110. However, in some cases, one or more of number of sources 140 may be considered part of monitoring system 112.

The illustration of power transmission system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, one or more of set of agents 126 may be implemented in one or more of plurality of control devices 128. Further, in some illustrative examples, when more than one agent is present in set of agents 126, these agents may be implemented in computers located remotely to each other. In other illustrative examples, set of agents 126 may be implemented as part of main controller 132.

Figure 2:
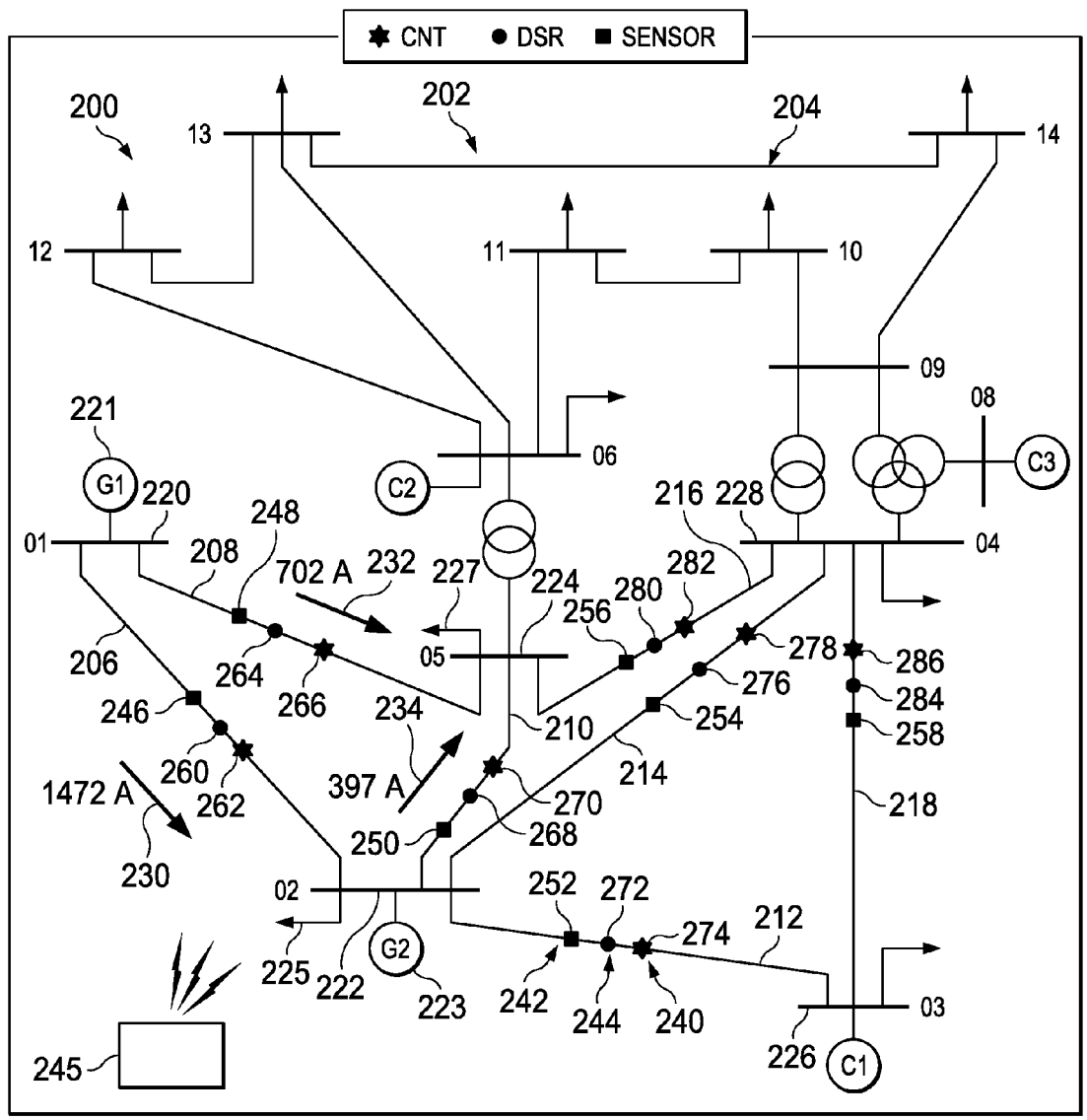
FIG. 2 is an illustration of a power grid in accordance with an illustrative embodiment.

With reference now to FIG. 2, an illustration of a power grid is depicted in accordance with an illustrative embodiment. Power grid 200 is an example of one implementation for power grid 104 in FIG. 1. As depicted, power transmission system 202 is part of power grid 200. Power transmission system 202 is an example of one implementation for power transmission system 100 in FIG. 1.

Power transmission system 202 includes plurality of transmission lines 204. Plurality of transmission lines 204 is configured to transfer power between different points in power grid 200. As depicted, transmission lines 206, 208, 210, 212, 214, 216, and 218 are examples of transmission lines in plurality of transmission lines 204.

Transmission line 206 carries power between bus 220 and bus 222. Transmission line 208 carries power between bus 220 and bus 224, and transmission line 210 carries power between bus 222 and bus 224. Further, transmission line 212 carries power between bus 222 and bus 226. Transmission line 214 carries power between bus 222 and bus 228, and transmission line 216 carries power between bus 224 and bus 228. Transmission line 218 carries power between bus 226 and bus 228.

Bus 220 receives power from generator 221. Bus 222 receives power from generator 223 and sends power to load 225. Bus 224 sends power to load 227.

As depicted, the flow of electrical current through transmission line 206 in the direction of arrow 230 is about 1,472 amperes (A). The flow of electrical current through transmission line 208 in the direction of arrow 232 is about 702 amperes (A). In this manner, the total amount of electrical current flowing from bus 220 may be about 2,174 amperes (A).

Further, the flow of electrical current through transmission line 210 in the direction of arrow 234 is about 397 amperes (A). The total flow of electrical current into bus 222 with respect to transmission line 206 and transmission line 210 is about 1,075 amperes (A).

In this illustrative example, power transmission system 202 includes ice management system 240. Ice management system 240 is configured to manage icing of plurality of transmission lines 204. Ice management system 240 includes monitoring system 242 and control system 244.

Monitoring system 242 includes a plurality of sensor systems corresponding to plurality of transmission lines 204. Sensor systems 246, 248, 250, 252, 254, 256, and 258 are examples of sensor systems in monitoring system 242. Sensor systems 246, 248, 250, 252, 254, 256, and 258 correspond to transmission lines 206, 208, 210, 212, 214, 216, and 218, respectively. Each of these sensors systems comprises one or more sensors configured to monitor the corresponding transmission line and the environment around the corresponding transmission line.

Control system 244 includes a set of agents and a plurality of control devices distributed along plurality of transmission lines 204. Agent 245 is an example of one of the set of agents in control system 244. Agent 245 is configured to receive sensor data from monitoring system 242. In particular, agent 245 is configured to receive sensor data from the different sensor systems in monitoring system 242.

Control devices 260, 262, 264, 266, 268, 270, 272, 274, 276, 278, 280, 282, 284, and 286 are examples of control devices in control system 244. As depicted, control device 260 and control device 262 are located on transmission line 206. Control device 264 and control device 266 are located on transmission line 208. Control device 268 and control device 270 are located on transmission line 210.

Further, control device 272 and control device 274 are located on transmission line 212. Control device 276 and control device 278 are located on transmission line 214. Control device 280 and control device 282 are located on transmission line 216, and control device 284 and control device 286 are located on transmission line 218.

Agent 245 uses the sensor data received from monitoring system 242 to determine whether anti-icing and/or deicing of one or more of plurality of transmission lines 204 is needed. Agent 245 may control any number of the control devices in control system 244 to perform anti-icing and/or deicing of one or more of plurality of transmission lines 204.

Figure 3:
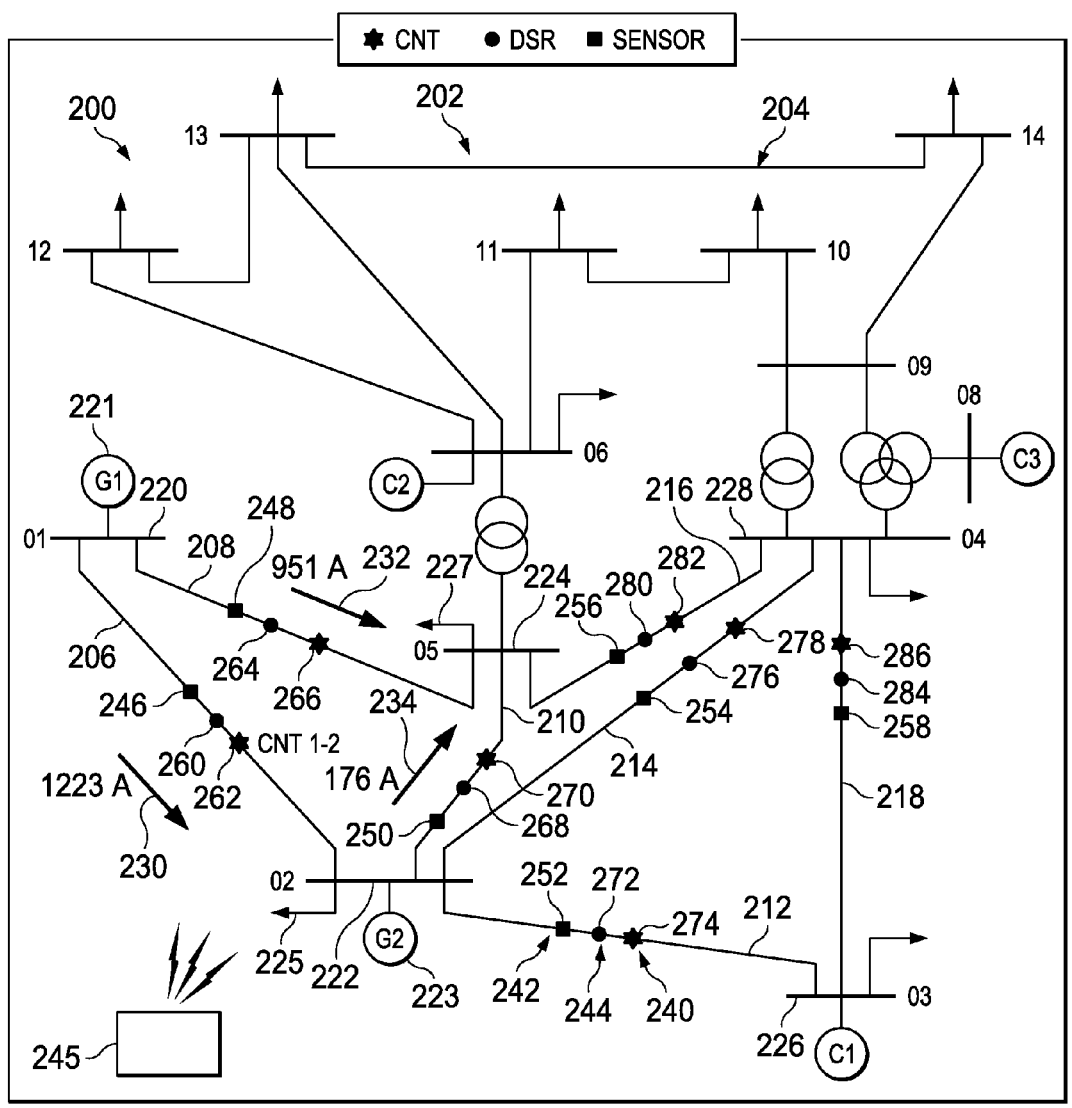
FIG. 3 is an illustration of a power grid in accordance with an illustrative embodiment.

With reference now to FIG. 3, an illustration of a power grid is depicted in accordance with an illustrative embodiment. In this illustrative example, agent 245 makes a determination that the possibility of ice forming on transmission line 208 is greater than selected tolerances. This determination may be based on weather data for the environment around transmission line 208 and a temperature for transmission line 208 received in sensor data from sensor system 248.

Based on this determination, agent 245 controls control device 264 and control device 266 to change the flow of power through transmission line 208 to perform anti-icing of transmission line 208. In particular, the flow of electrical current through transmission line 208 is increased in the direction of arrow 232.

This increase in the flow of electrical current through transmission line 208 heats transmission line 208 to a temperature that reduces the possibility of water adhering to transmission line 208 and solidifying as frost or ice. The flow of electrical current through transmission line 208 in the direction of arrow 232 is increased to about 951 amperes (A).

This increase in the flow of electrical current through transmission line 208 may increase the amount of power carried from bus 220 and may increase the amount of power delivered to bus 224 more than desired. Agent 245 is configured to control the flow of power through plurality of transmission lines 204 such that the overall flow of power to and from bus 220, bus 222, and bus 224 remains substantially constant within selected tolerances. In this illustrative example, the selected tolerances may be, for example, without limitation, about 10 amperes (A).

For example, agent 245 decreases the flow of electrical current through transmission line 206 in the direction of arrow 230 to about 1,223 amperes (A). Agent 245 performs this decrease in the flow of electrical current through transmission line 206 using control device 260 and control device 262.

The total amount of electrical current flowing from bus 220 is about 2,174 amperes (A). This amount of electrical current is substantially equal to the amount of electrical current that flowed from bus 220 prior to anti-icing of transmission line 208.

Further, agent 245 decreases the flow of electrical current through transmission line 210 in the direction of arrow 234 to about 176 amperes (A). Agent 245 performs this decrease in the flow of electrical current through transmission line 210 using control device 268 and control device 270.

The total flow of electrical current into bus 222 with respect to transmission line 206 and transmission line 210 is about 1,047 amperes (A). The difference between this total flow of electrical current into bus 222 and the total flow of electrical current into bus 222 prior to anti-icing with respect to transmission line 206 and transmission line 210 is less than about 10 amperes (A).

In this manner, agent 245 performs anti-icing for transmission line 208 without changing the overall flow of power between bus 220, bus 222, and bus 224 more than selected tolerances. In particular, agent 245 performs anti-icing for transmission line 208 without changing the total amount of power flowing into power transmission system 202 and without changing the total amount of power flowing out of power transmission system 202.

For example, anti-icing is performed without changing the power generated by generator 221 that flows into bus 220 or the power generated by generator 223 that flows into bus 222. Further, anti-icing is performed without changing the power sent to load 225 from bus 222 or the power sent to load 227 from bus 224. Although this illustrative example has been described with respect to anti-icing, agent 245 may perform deicing of transmission line 208 in a similar manner.

The illustrations of power grid 200 in FIG. 2 and FIG. 3 are not meant to imply physical or architectural limitations to the manner in which an illustrative embodiment may be implemented. Other components in addition to or in place of the ones illustrated may be used. Some components may be optional.

The different components shown in FIG. 2 and FIG. 3 may be combined with components in FIG. 1, used with components in FIG. 1, or a combination of the two. Additionally, some of the components in these figures may be illustrative examples of how components shown in block form in FIG. 1 may be implemented as physical structures.

Figure 4:
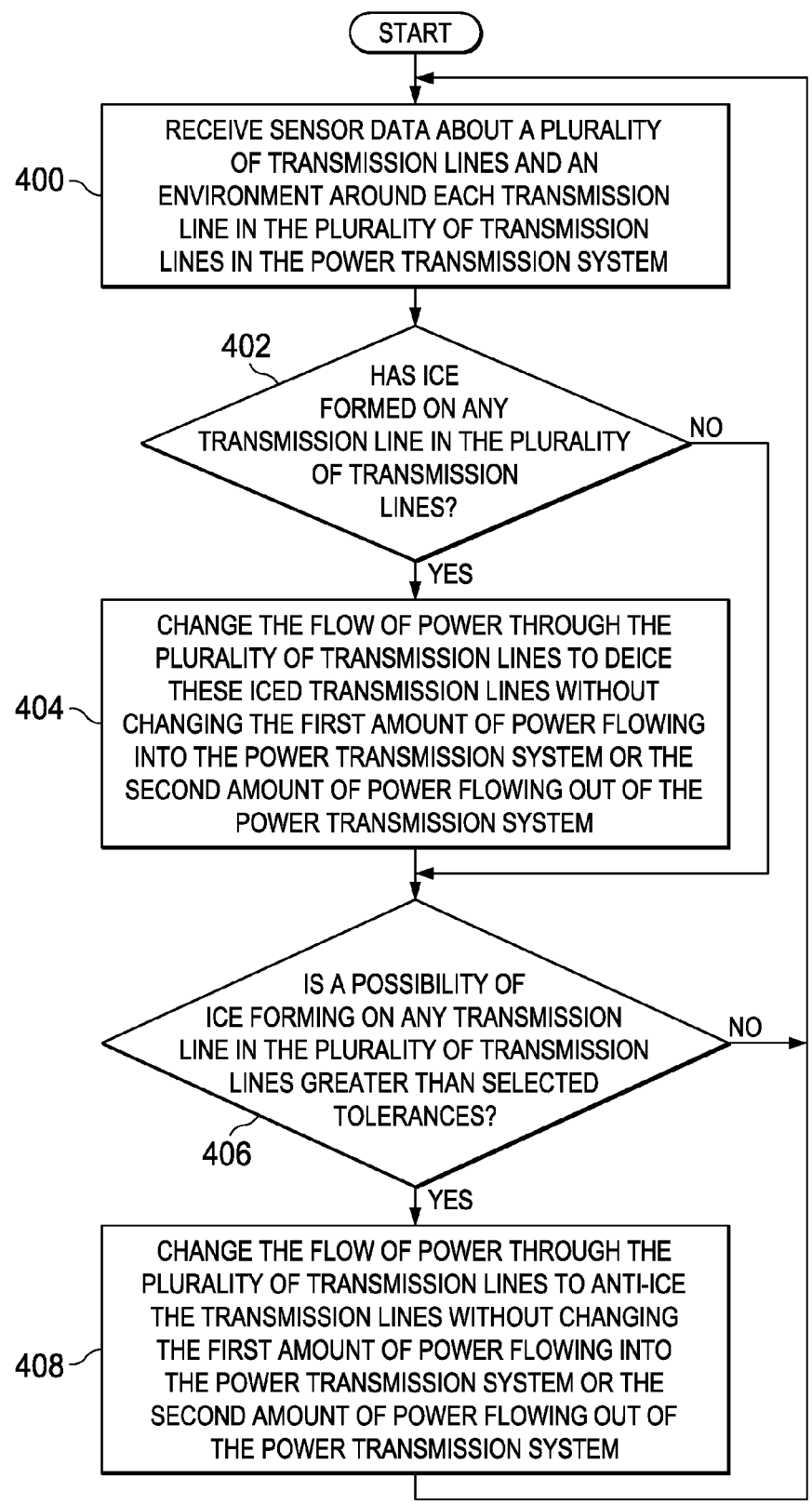
FIG. 4 is an illustration of a process for managing icing of a plurality of transmission lines in a transmission system in the form of a flowchart in accordance with an illustrative embodiment.

With reference now to FIG. 4, an illustration of a process for managing icing of a plurality of transmission lines in a transmission system is depicted in accordance with an illustrative embodiment. The process illustrated in FIG. 4 may be implemented using, for example, ice management system 110 in FIG. 1, and to manage the formation of ice on, for example, plurality of transmission lines 102 in power transmission system 100 in FIG. 1.

The process begins by receiving sensor data about a plurality of transmission lines and an environment around each transmission line in the plurality of transmission lines in the power transmission system (operation 400). In operation 400, the sensor data may include, for example, temperature data for the plurality of transmission lines, weather data, humidity data, environmental temperature data, and/or other suitable data. The sensor data may be received from a plurality of sensor systems corresponding to the plurality of transmission lines.

The plurality of transmission lines is configured to electrically connect a plurality of points in a power grid to each other. A first amount of power flows into the power transmission system from a power generation system. A second amount of power flows out of the power transmission system into a power distribution system.

The process then determines whether ice has formed on any transmission lines in the plurality of transmission lines (operation 402). Ice on a transmission line may include frozen water, frost, snow, or a combination of these three.

If the process determines that ice has formed on one or more transmission lines in the plurality of transmission lines, the process changes the flow of power through the plurality of transmission lines to deice these iced transmission lines without changing the first amount of power flowing into the power transmission system or the second amount of power flowing out of the power transmission system (operation 404). In other words, the first amount of power flowing into the power transmission system and the second amount of power flowing out of the power transmission system remains substantially constant within selected tolerances after the flow of power through the plurality of transmission lines is changed.

The process then determines whether a possibility of ice forming on any transmission line in the plurality of transmission lines is greater than selected tolerances (operation 406). If the process determines that the possibility of ice forming on one or more transmission line in the plurality of transmission lines is not greater than selected tolerances, the process returns to operation 400 as described above.

Otherwise, the process changes the flow of power through the plurality of transmission lines to anti-ice the transmission lines without changing the first amount of power flowing into the power transmission system or the second amount of power flowing out of the power transmission system (operation 408). The process then returns to operation 400 as described above.

With reference again to operation 402, if the process determines that ice has not formed on any transmission line in the plurality of transmission lines, the process proceeds to operation 406 as described above. In this manner, the process described in FIG. 4 may change the flow of power through the plurality of transmission lines to manage icing of the plurality of transmission lines without changing the power generated by the power generation system and the power received by the power distribution system.

Figure 5A:
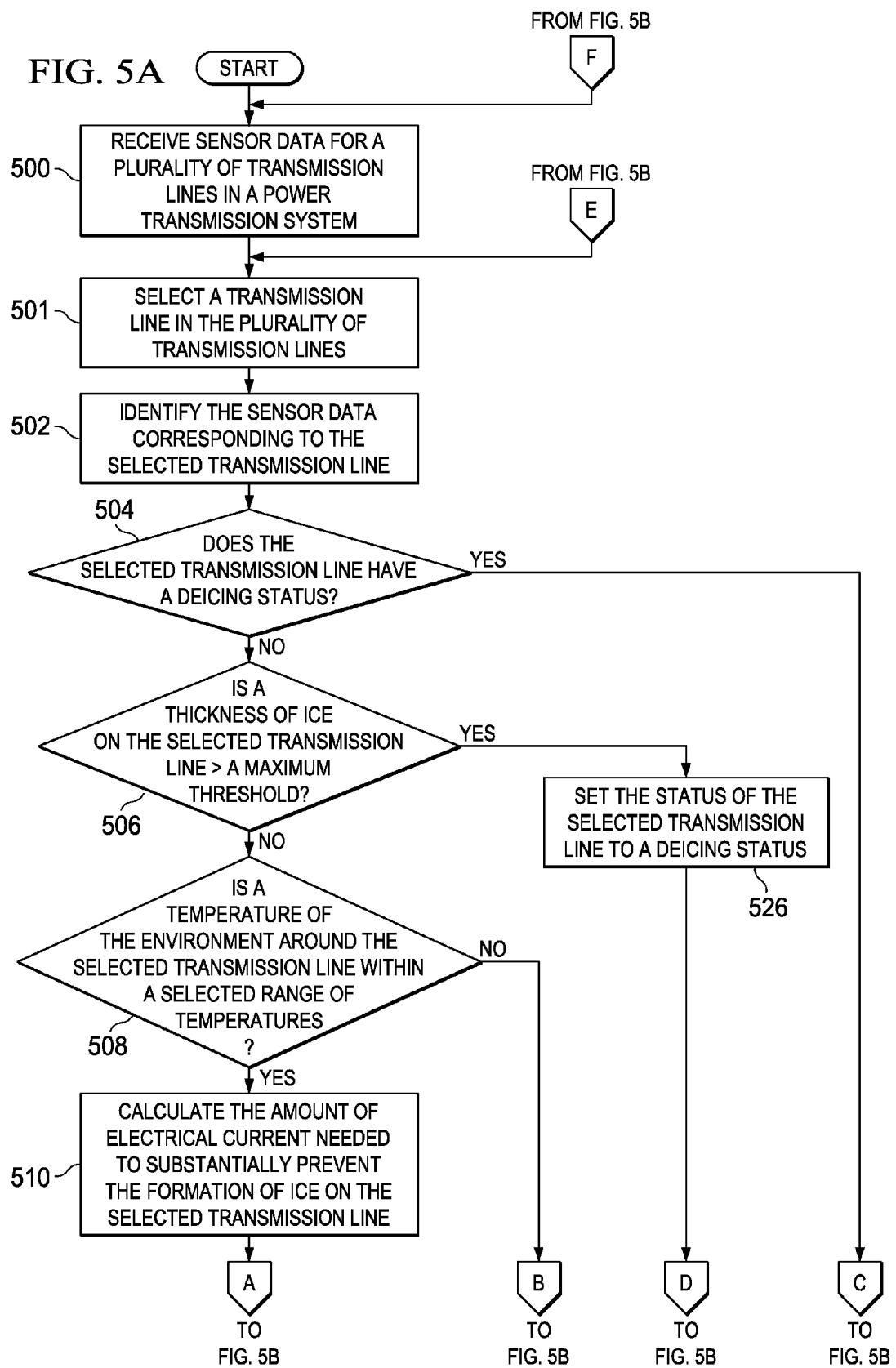

With reference now to FIGS. 5A and 5B, illustrations of a process for managing icing of a plurality of transmission lines in a transmission system is depicted in accordance with an illustrative embodiment. The process illustrated in FIGS. 5A and 5B may be implemented using ice management system 110 to manage the formation of ice on plurality of transmission lines 102 in power transmission system 100 in FIG. 1. In particular, this process may be implemented using set of agents 126 in ice management system 110 in FIG. 1.

The process begins by receiving sensor data for a plurality of transmission lines in a power transmission system (operation 500). The sensor data may include sensor data about the plurality of transmission lines and sensor data about an environment around each of the plurality of transmission lines. For example, the sensor data may include, without limitation, environmental temperature data, wind speed data, humidity data, weather data, ice detection measurements, transmission line temperature data, and/or other suitable types of data. In this illustrative example, the sensor data may be continuously or periodically received by the set of agents during the process described in FIG. 5.

The process then selects a transmission line in the plurality of transmission lines (operation 501). Next, the process identifies the sensor data corresponding to the selected transmission line (operation 502).

Thereafter, the process determines whether the selected transmission line has a deicing status (operation 504). A transmission line has a deicing status when the transmission line is currently being deiced. If the selected transmission line does not have the deicing status, the process determines whether a thickness of ice on the selected transmission line is greater than a maximum threshold (operation 506). When ice is not present on the selected transmission line, the thickness of the ice may be substantially zero.

If the thickness of ice on the selected transmission line is not greater than the maximum threshold, the process determines whether a temperature of the environment around the selected transmission line is within a selected range of temperatures (operation 508). The selected range of temperatures may be, for example, between about negative four degrees Celsius (C.°) and about two degrees Celsius (C.°).

If the temperature of the environment around the selected transmission line is within the selected range of temperatures, the process calculates the amount of electrical current needed to substantially prevent the formation of ice on the selected transmission line (operation 510). The process then determines whether the current amount of electrical current flowing through the selected transmission line is substantially equal to or greater than the calculated amount of electrical current (operation 512).

If the current amount of electrical current flowing through the selected transmission line is not substantially equal to or greater than the calculated amount of electrical current, the process calculates the possibility of ice forming on the selected transmission line based on other sensor data (operation 514). The process then determines whether the selected transmission line needs to be anti-iced (operation 516). In operation 516, this determination may be made based on whether the possibility of ice forming on the selected transmission line is greater than selected tolerances.

If the selected transmission line needs to be anti-iced, the process sets the status of the selected transmission line to an anti-icing status (operation 518). Thereafter, the process determines whether any additional unprocessed transmission lines are present in the plurality of transmission lines (operation 520). If any unprocessed transmission lines are present, the process returns to operation 501 as described above.

Otherwise, the process changes the flow of power through the plurality of transmission lines to perform deicing of the transmission lines having a deicing status and to perform anti-icing of the transmission lines having an anti-icing status (operation 522). The process then returns to operation 500 as described above.

With reference again to operation 516, if the selected transmission line does not need to be anti-iced, the process sets the status of the selected transmission line to a normal status (operation 524). The process then returns to operation 520 as described above.

With reference again to operation 512, if the amount of electrical current flowing through the selected transmission line is substantially equal to or greater than the calculated amount of electrical current, the process proceeds to operation 524 as described above. With reference again to operation 508, if the temperature of the environment around the selected transmission line is not within the selected range of temperatures, the process proceeds to operation 524 as described above.

Further, with reference again to operation 506, if the thickness of ice on the selected transmission line is greater than the maximum threshold for ice thickness, the process sets the status of the selected transmission line to a deicing status (operation 526). The process then proceeds to operation 520 as described above.

With reference again to operation 504, if the selected transmission line has a deicing status, the process determines whether a thickness of ice on the selected transmission line is less than or substantially equal to a minimum threshold (operation 528). If the thickness of ice on the selected transmission line is not less than or substantially equal to the minimum threshold, the process proceeds to operation 520 as described above. Otherwise, the process proceeds to operation 524 as described above.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, in some illustrative examples, operation 402 and operation 404 in FIG. 4 may be optional. In other illustrative examples, operation 406 and operation 408 may be optional. In other words, in some cases, only anti-icing operations or only deicing operations may be performed.

Figure 6:
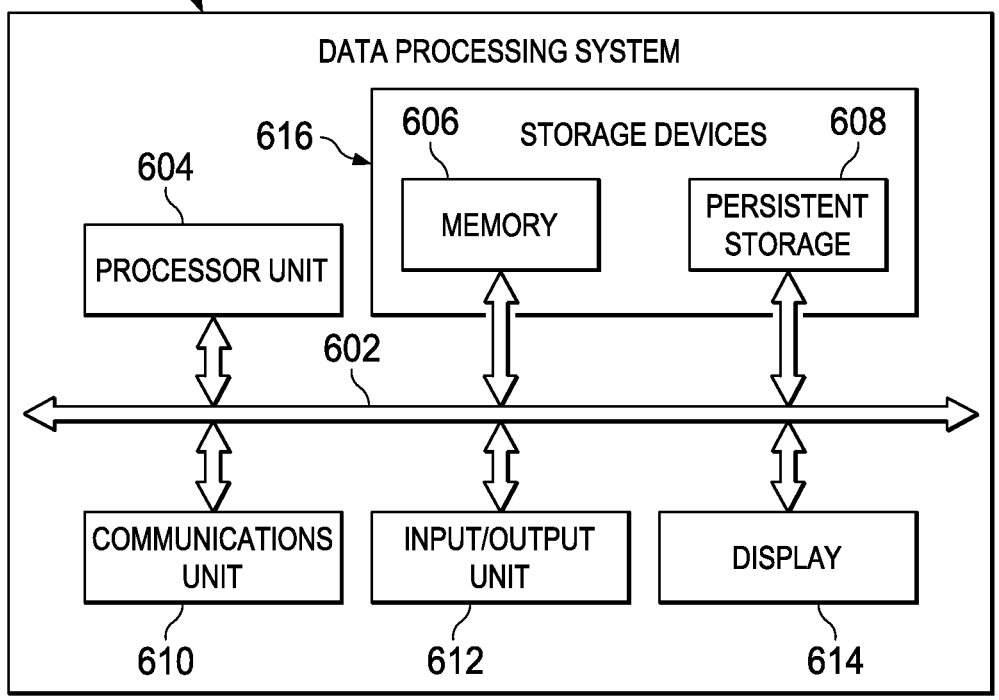
FIG. 6 is an illustration of a data processing system in accordance with an illustrative embodiment.

With reference now to FIG. 6, an illustration of a data processing system is depicted in accordance with an illustrative embodiment. In this illustrative example, data processing system 600 may be used to implement one or more computers in computer system 130 in FIG. 1. In some cases, data processing system 600 may be used to implement one or more control devices in plurality of control devices 128 in FIG. 1.

In this illustrative example, data processing system 600 includes communications framework 602. Communications framework 602 provides communications between processor unit 604, memory 606, persistent storage 608, communications unit 610, input/output (I/O) unit 612, and display 614 in data processing system 600.

Processor unit 604 serves to execute instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 also may be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications framework 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and the computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600. In some instances, computer readable storage media 624 may not be removable from data processing system 600.

In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is a media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications framework 602 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 606 or a cache, such as found in an interface and memory controller hub that may be present in communications framework 602.

Thus, the different illustrative embodiments provide a method and apparatus for managing the formation of ice on a plurality of transmission lines in a power transmission system. In one illustrative embodiment, a power transmission system comprises a plurality of transmission lines and a control system. A first amount of power flows into the power transmission system through the plurality of transmission lines and a second amount of power flows out of the power transmission system through the plurality of transmission lines. The control system is configured to change a flow of power through the plurality of transmission lines such that icing of the plurality of transmission lines is managed. The first amount of power flowing into the power transmission system and the second amount of power flowing out of the power transmission system remains substantially constant after the flow of power through the plurality of transmission lines is changed.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A power transmission system comprising:
a plurality of transmission lines, wherein a first amount of power flows into the power transmission system through the plurality of transmission lines and a second amount of power flows out of the power transmission system through the plurality of transmission lines; and
a control system configured to change a flow of power through the plurality of transmission lines such that icing of the plurality of transmission lines is managed, wherein the first amount of power flowing into the power transmission system and the second amount of power flowing out of the power transmission system remains substantially constant during the change in the flow of power through the plurality of transmission lines, and wherein the icing is managed by increasing an amount of power flowing through a first transmission line of the plurality of transmission lines and decreasing an amount of power flowing through a second transmission line of the plurality of transmission lines while the first amount of power and the second amount of power remain substantially constant.

2. The power transmission system of claim 1, wherein the control system is configured to change the flow of power through the plurality of transmission lines such that a portion of the plurality of transmission lines is anti-iced, wherein the first amount of power flowing into the power transmission system and the second amount of power flowing out of the power transmission system remains substantially constant during the change in the flow of power through the plurality of transmission lines.

3. The power transmission system of claim 1, wherein the control system is configured to change the flow of power through the plurality of transmission lines such that a portion of the plurality of transmission lines is deiced, wherein the first amount of power flowing into the power transmission system and the second amount of power flowing out of the power transmission system remains substantially constant during the change in the flow of power through the plurality of transmission lines.

4. The power transmission system of claim 1, wherein the control system comprises:
a plurality of control devices distributed along the plurality of transmission lines in which a control device in the plurality of control devices located on a transmission line in the plurality of transmission lines is configured to change a flow of electrical current through the transmission line.

5. The power transmission system of claim 4, wherein the control device is configured to change the flow of electrical current through the transmission line by at least one of changing an amount of electrical current that flows through the transmission line, changing a voltage across the transmission line, and changing an impedance for the transmission line.

6. The power transmission system of claim 4, wherein the control device is selected from one of a distributed flexible alternating current transmission system device, a transformer, a switch, a controllable network transformer, and a distributed series reactance device.

7. The power transmission system of claim 4, wherein the control system further comprises:
a set of agents configured to control the plurality of control devices based on sensor data received from a monitoring system.

8. The power transmission system of claim 7, wherein the control system further comprises:
a main controller configured to send control data to the set of agents, wherein the set of agents is configured to control the plurality of control devices based on the sensor data received from the monitoring system and the control data received from the main controller.

9. The power transmission system of claim 1 further comprising:
a monitoring system configured to monitor the plurality of transmission lines and an environment around each transmission line in the plurality of transmission lines.

10. The power transmission system of claim 9, wherein the monitoring system comprises:
a plurality of sensor systems configured to generate sensor data about the plurality of transmission lines and the environment around the each transmission line in the plurality of transmission lines and send the sensor data to the control system, wherein the control system is configured to change the flow of power through the plurality of transmission lines based on the sensor data.

11. The power transmission system of claim 10, wherein each sensor system in the plurality of sensor systems corresponds to a transmission line in the plurality of transmission lines.

12. The power transmission system of claim 11, wherein a sensor system in the plurality of sensor systems corresponding to a particular transmission line in the plurality of transmission lines comprises a number of sensors distributed in a number of locations along the particular transmission line, wherein the number of sensors includes at least one of a temperature sensor, a weather sensor, a voltage sensor, a current sensor, a power sensor, a humidity sensor, and an ice detection sensor.

13. The power transmission system of claim 10, wherein the first amount of power flowing into the power transmission system and the second amount of power flowing out of the power transmission system remains substantially constant within selected tolerances during the change in the flow of power through the plurality of transmission lines.

14. The power transmission system of claim 1,
wherein the plurality of transmission lines electrically connect a plurality of points in a power grid; and
wherein the first transmission line and the second transmission line are connected to a same point in the power grid.

15. A method for managing icing of a plurality of transmission lines in a power transmission system, the method comprising:
receiving sensor data about the plurality of transmission lines and an environment around each transmission line in the plurality of transmission lines in the power transmission system,
wherein a first amount of power flows into the power transmission system through the plurality of transmission lines and a second amount of power flows out of the power transmission system through the plurality of transmission lines; and
changing a flow of power through the plurality of transmission lines based on the sensor data such that the icing of the plurality of transmission lines is managed, wherein the first amount of power flowing into the power transmission system and the second amount of power flowing out of the power transmission system remains substantially constant during the change in the flow of power through the plurality of transmission lines, and wherein the icing is managed by increasing an amount of power flowing through a first transmission line of the plurality of transmission lines and decreasing an amount of power flowing through a second transmission line of the plurality of transmission lines while the first amount of power and the second amount of power remain substantially constant.

16. The method of claim 15, wherein the step of changing the flow of power through the plurality of transmission lines based on the sensor data such that the icing of the plurality of transmission lines is managed comprises:
    changing the flow of power through the plurality of transmission lines such that a portion of the plurality of transmission lines is anti-iced, wherein the first amount of power flowing into the power transmission system and the second amount of power flowing out of the power transmission system remains substantially constant during the change in the flow of power through the plurality of transmission lines.

17. The method of claim 15, wherein the step of changing the flow of power through the plurality of transmission lines based on the sensor data such that the icing of the plurality of transmission lines is managed comprises:
    changing the flow of power through the plurality of transmission lines such that a portion of the plurality of transmission lines is deiced, wherein the first amount of power flowing into the power transmission system and the second amount of power flowing out of the power transmission system remains substantially constant during the change in the flow of power through the plurality of transmission lines.

18. The method of claim 15, wherein the step of changing the flow of power through the plurality of transmission lines based on the sensor data such that the icing of the plurality of transmission lines is managed comprises:
    changing the flow of power through the plurality of transmission lines based on the sensor data such that the icing of the plurality of transmission lines is managed using a plurality of control devices distributed along the plurality of transmission lines, wherein a control device in the plurality of control devices located on a transmission line in the plurality of transmission lines is configured to change a flow of electrical current through the transmission line.

19. The method of claim 18, wherein the step of changing the flow of power through the plurality of transmission lines based on the sensor data such that the icing of the plurality of transmission lines is managed using the plurality of control devices distributed along the plurality of transmission lines, wherein the control device in the plurality of control devices located on the transmission line in the plurality of transmission lines is configured to change the flow of electrical current through the transmission line comprises:
    changing the flow of electrical current through the transmission line using the control device by at least one of changing an amount of electrical current that flows through the transmission line, changing a voltage across the transmission line, and changing an impedance for the transmission line.

20. The method of claim 15, wherein the step of changing the flow of power through the plurality of transmission lines based on the sensor data such that the icing of the plurality of transmission lines is managed comprises:
    controlling a plurality of control devices distributed along the plurality of transmission lines to change the flow of power through the plurality of transmission lines using a set of agents, wherein the set of agents controls the plurality of control devices based on the sensor data.

21. The method of claim 15 further comprising:
    generating the sensor data about the plurality of transmission lines and the environment around the each transmission line in the plurality of transmission lines using a plurality of sensor systems.

* * * * *